United States Patent
Pala et al.

(10) Patent No.: US 12,250,308 B2
(45) Date of Patent: Mar. 11, 2025

(54) METHOD AND APPARATUS FOR MANAGING CRYPTOGRAPHIC KEYS

(71) Applicant: Robert Bosch GmbH, Stuttgart (DE)

(72) Inventors: Diego Pala, Bochum (DE); Teona Tatovic, Bochum (DE); Lukas Riemenschneider, Shanghai (CN)

(73) Assignee: ROBERT BOSCH GMBH, Stuttgart (DE)

( * ) Notice: Subject to any disclaimer, the term of this patent is extended or adjusted under 35 U.S.C. 154(b) by 458 days.

(21) Appl. No.: 17/448,277

(22) Filed: Sep. 21, 2021

(65) Prior Publication Data

US 2022/0116213 A1    Apr. 14, 2022

(30) Foreign Application Priority Data

Oct. 9, 2020   (DE) .......................... 102020212772.7

(51) Int. Cl.
   *H04L 9/08*   (2006.01)
(52) U.S. Cl.
   CPC ........ *H04L 9/0894* (2013.01); *H04L 2209/84* (2013.01)
(58) Field of Classification Search
   CPC .. H04L 9/0894; H04L 2209/84; H04L 9/0891
   See application file for complete search history.

(56) References Cited

U.S. PATENT DOCUMENTS

| | | | | |
|---|---|---|---|---|
| 7,343,496 B1* | 3/2008 | Hsiang | .................... | G07F 9/105 |
| | | | | 361/672 |
| 7,773,754 B2* | 8/2010 | Buer | .................... | G06F 21/602 |
| | | | | 380/278 |
| 8,340,299 B2* | 12/2012 | Buer | .................... | G06F 21/602 |
| | | | | 380/278 |
| 8,484,486 B2* | 7/2013 | Deierling | .............. | G06F 21/602 |
| | | | | 713/193 |
| 9,418,026 B2* | 8/2016 | Hadley | .................... | G06F 21/74 |
| 10,785,024 B2* | 9/2020 | Jaquette | ................ | H04L 9/0897 |
| 11,016,926 B1* | 5/2021 | Nasser | .................. | H04L 9/0631 |
| 2006/0115085 A1* | 6/2006 | Iwamura | ............... | H04L 9/0891 |
| | | | | 380/259 |
| 2007/0237325 A1* | 10/2007 | Gershowitz | ............. | G06F 21/72 |
| | | | | 380/30 |
| 2016/0099806 A1* | 4/2016 | Racklyeft | ............. | H04W 12/08 |
| | | | | 380/281 |
| 2016/0315766 A1* | 10/2016 | Ujiie | .................... | H04L 63/0428 |
| 2017/0060559 A1* | 3/2017 | Ye | .............................. | G06F 8/65 |
| 2017/0324558 A1* | 11/2017 | Takemori | .............. | G06F 21/575 |
| 2017/0366342 A1* | 12/2017 | Gehrmann | .......... | H04L 63/0435 |
| 2018/0183605 A1* | 6/2018 | Kawabata | ............. | H04L 9/0819 |
| 2018/0227120 A1* | 8/2018 | Takemori | .................. | H04L 9/08 |

(Continued)

OTHER PUBLICATIONS

Kurachi et al.; "Asymmetric key-based secure ECU replacement without PKI", 2019, IEEE 19th International Symposium on High Assurance Systems Engineering (HASE), pp. 234-240. (Year: 2019).*

*Primary Examiner* — Matthew Smithers

(74) *Attorney, Agent, or Firm* — NORTON ROSE FULBRIGHT US LLP; Gerard A. Messina

(57) ABSTRACT

A method for managing cryptographic keys for a control device, in particular for a motor vehicle. The method includes the following steps: associating a state with at least one of the cryptographic keys; using the at least one cryptographic key based on the state.

12 Claims, 7 Drawing Sheets

(56) References Cited

U.S. PATENT DOCUMENTS

| | | | |
|---|---|---|---|
| 2019/0007217 A1* | 1/2019 | Takemori | G06F 21/64 |
| 2019/0068361 A1* | 2/2019 | Ye | H04W 4/48 |
| 2019/0238331 A1* | 8/2019 | Chandra | H04L 9/0861 |
| 2019/0245689 A1* | 8/2019 | Eckel | G06F 21/74 |
| 2019/0245691 A1* | 8/2019 | Takemori | H04L 9/0822 |
| 2019/0261176 A1* | 8/2019 | Yamazaki | H04L 63/061 |
| 2019/0265965 A1* | 8/2019 | Acharya | H04L 9/3263 |
| 2019/0394035 A1* | 12/2019 | Jaquette | H04L 9/0891 |
| 2020/0014544 A1* | 1/2020 | Sela | G06F 21/79 |
| 2020/0028683 A1* | 1/2020 | Windle | H04L 9/088 |
| 2020/0059359 A1* | 2/2020 | Sugano | H04L 9/0894 |
| 2020/0084031 A1* | 3/2020 | Stählin | H04L 9/0877 |
| 2020/0211301 A1* | 7/2020 | Zhang | H04L 63/065 |
| 2020/0213287 A1* | 7/2020 | Zhang | H04L 12/40045 |
| 2020/0264864 A1* | 8/2020 | Yang | H04W 4/40 |
| 2021/0019450 A1* | 1/2021 | Li | G11C 29/44 |

\* cited by examiner

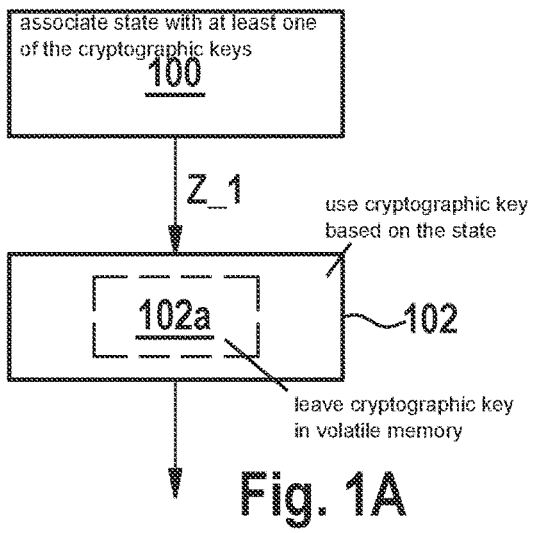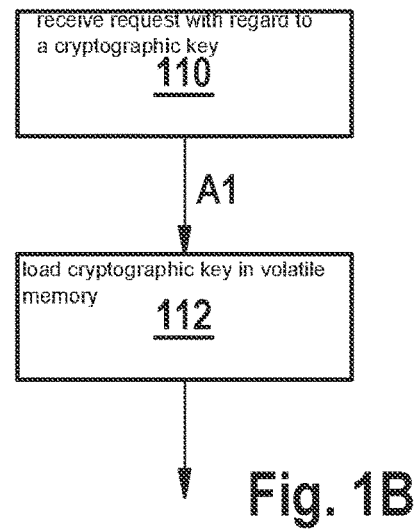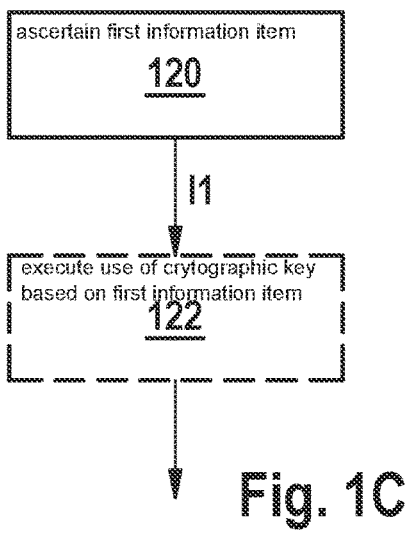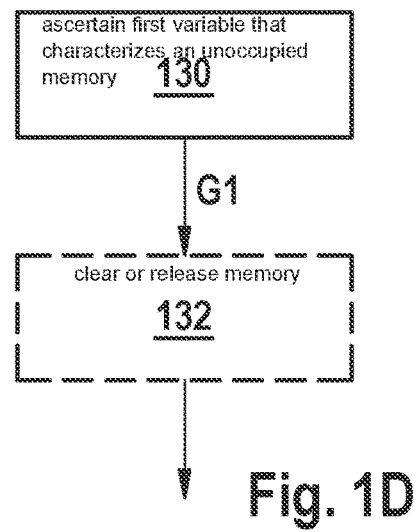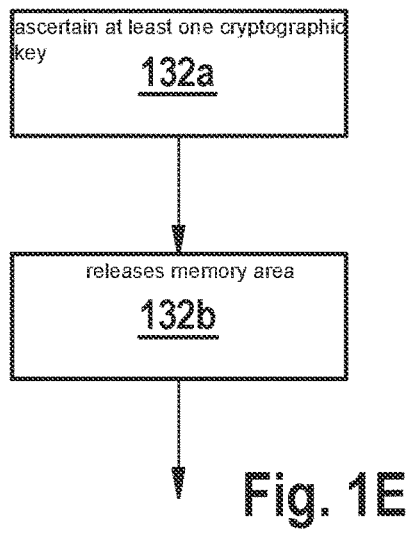

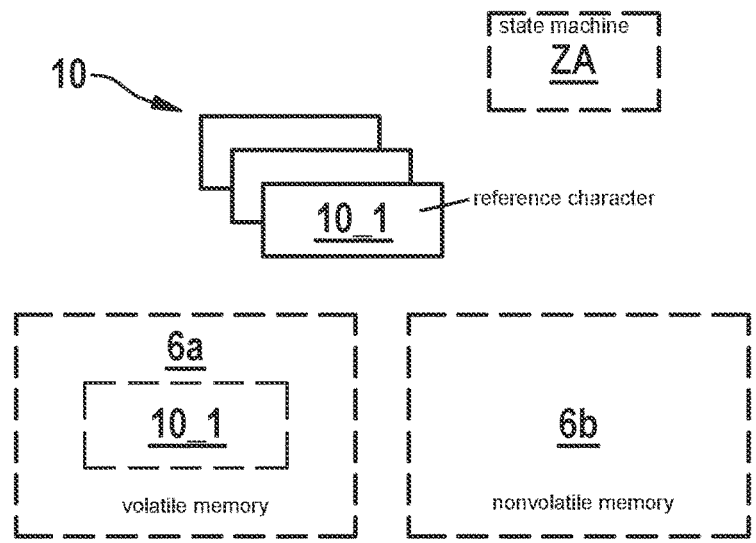
Fig. 2
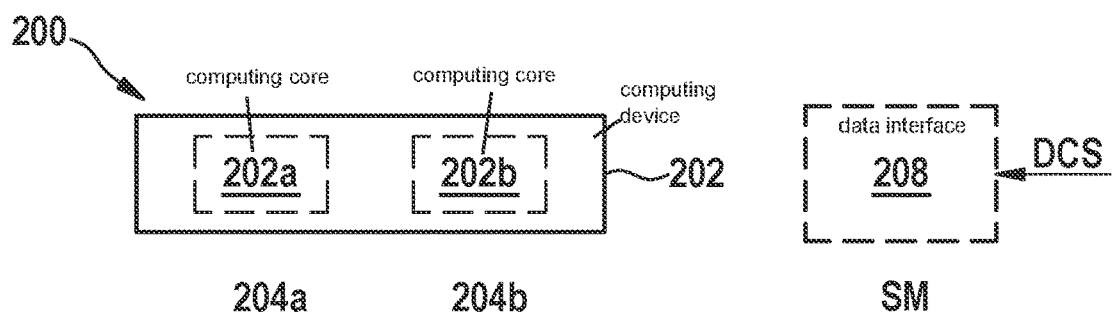
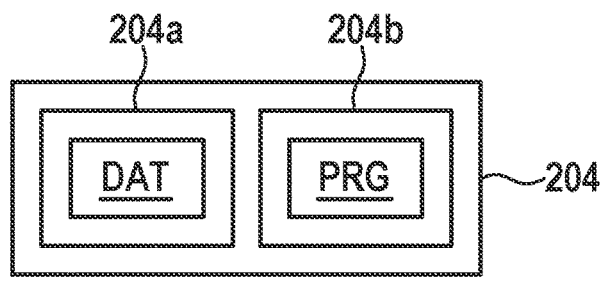
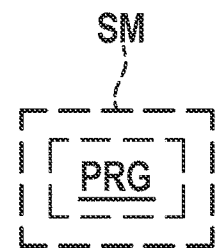
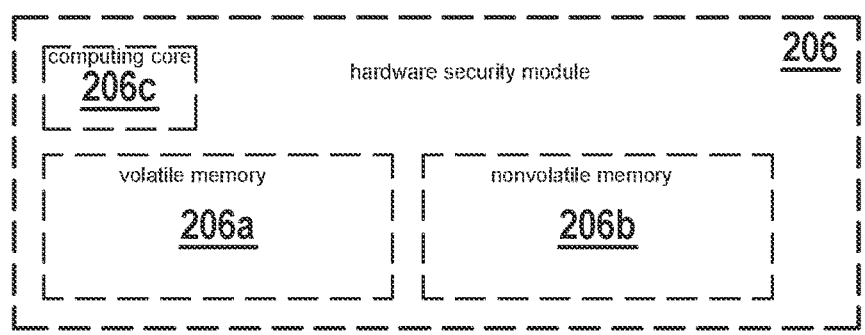
Fig. 3

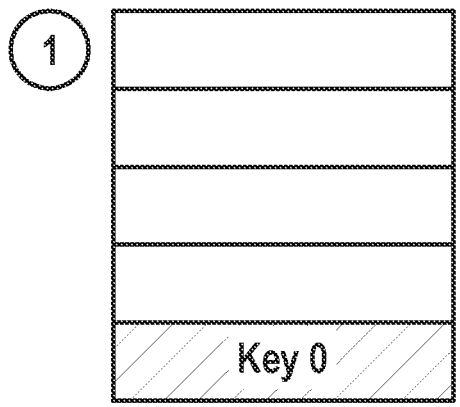
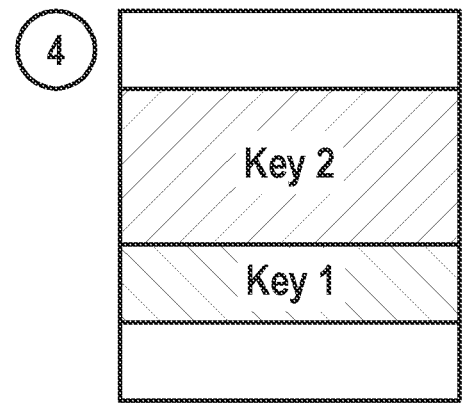
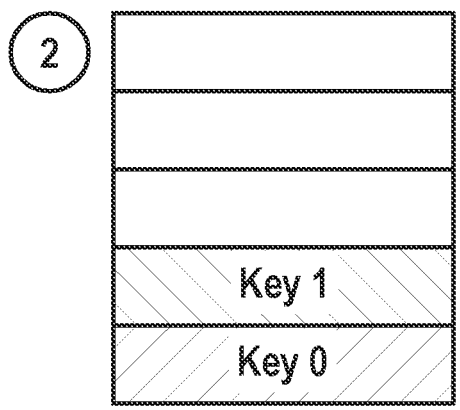
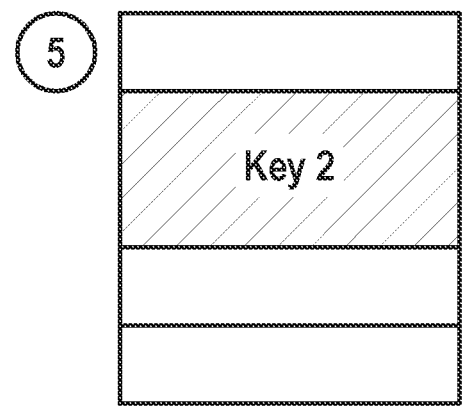
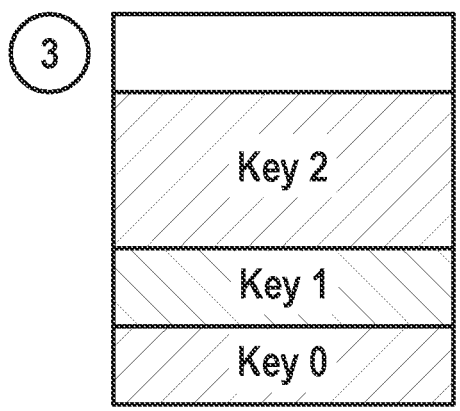
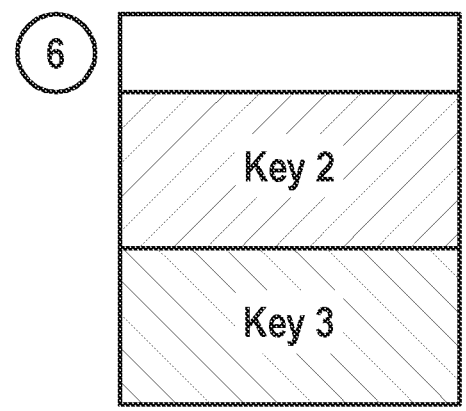
Fig. 9

METHOD AND APPARATUS FOR MANAGING CRYPTOGRAPHIC KEYS

CROSS REFERENCE

The present application claims the benefit under 35 U.S.C. § 119 of German Patent Application No. 102020212772.7 filed on Oct. 9, 2020, which is expressly incorporated herein by reference in its entirety.

FIELD

The present invention relates to a method for managing cryptographic keys.

The present invention further relates to an apparatus for managing cryptographic keys.

SUMMARY

Exemplifying embodiments of the present invention refer to a method for managing cryptographic keys, for example for a control device, in particular for a motor vehicle, having the following steps: associating a state with at least one of the cryptographic keys; using the at least one cryptographic key based on the state. In further exemplifying embodiments this makes possible flexible utilization or use of the at least one cryptographic key.

In further exemplifying embodiments of the present invention, provision is made that the at least one cryptographic key is storable and/or stored at least temporarily in a volatile memory, for example a working memory or a register memory.

In further exemplifying embodiments of the present invention, provision is made that the at least one cryptographic key is storable and/or stored at least temporarily in a nonvolatile memory, for example a flash (EEPROM) memory.

In further exemplifying embodiments of the present invention, the at least one cryptographic key can also, for instance, be copied or shifted from the nonvolatile memory into the volatile memory, which can also be referred to, for example, as "loading."

In further exemplifying embodiments of the present invention, a deletion or release for overwriting a cryptographic key stored in the volatile memory can also be referred to, for example, as "unloading."

In further exemplifying embodiments of the present invention, the volatile memory and/or the nonvolatile memory can be associated, for instance, with at least one hardware security module (HSM).

In further exemplifying embodiments of the present invention, the volatile memory and/or the nonvolatile memory can be integrated, for instance, into the at least one hardware security module (HSM).

In further exemplifying embodiments of the present invention, the HSM can be associated, for example, with a control device or with a computing device of a control device and, for instance, can perform cryptographic functions or processes and, for instance, can manage the aforesaid cryptographic key.

In further exemplifying embodiments of the present invention, provision is made that the state of the at least one cryptographic key is characterized by at least one of the following elements: a) unloaded, the at least one cryptographic key being, for example, not located in a or the volatile memory (but instead, for example, in a or the nonvolatile memory); b) loaded and in use, the at least one cryptographic key, for example, being located in a or the volatile memory and currently being used, for example, by a computer program, for example a cryptography driver object; c) loaded and not in use, the at least one cryptographic key, for example, being located in a or the volatile memory and not currently being used, for example not (even) by a or the cryptography driver object; d) loading, a loading operation of the at least one cryptographic key, for example from a or the nonvolatile memory into a or the volatile memory, being, for example, not already complete; e) unloading, an unloading operation of the at least one cryptographic key, for example from a or the volatile memory, being, for example, not already complete; f) waiting for unoccupied memory space in a or the volatile memory (e.g., until memory space in the volatile memory has been cleared, for instance by deletion or unloading of another key); g) updating, for example upon request by another unit or higher-level (processing) layer. In further exemplifying embodiments, a cryptographic key having the "updating" state is not used. In further exemplifying embodiments, for example, it is possible instead to wait for a subsequent state in which updating of the cryptographic key is complete.

In further exemplifying embodiments of the present invention, one or several cryptography driver sessions or contexts, which can also be referred to as "cryptography driver objects," are implemented, for example, by way of a cryptography driver. In further exemplifying embodiments, the cryptography driver contexts are independent of one another and, for instance, can perform different tasks at least partly overlappingly in time, while one cryptography driver context is embodied in each case, for instance, to perform one task. In further exemplifying embodiments, a cryptographic key can be used, for instance, simultaneously by several different cryptography driver contexts.

In further exemplifying embodiments of the present invention, a quantity of cryptography driver contexts or cryptography driver objects is statically predefined, for example at a compile time (or "translation time" of the software, for instance, from a programming language into an object code), and is therefore constant during a runtime of the software. In further exemplifying embodiments, "jobs" are also associated statically with cryptography driver objects.

In further exemplifying embodiments of the present invention, cryptography driver contexts or cryptography driver objects are dynamically predefinable.

In further exemplifying embodiments of the present invention, a cryptography driver object is a software component (computer program) that corresponds, for instance, to a, for example, independent (hardware) device, for example an advanced encryption standard (AES) accelerator, to a component of a hardware security module, e.g., a computing core, or to a session of a hardware security module which is embodied, for instance, to execute various cryptography primitives.

In further exemplifying embodiments of the present invention, the cryptography driver object is executed on a computing core of a or the computing device ("host core").

In further exemplifying embodiments of the present invention, a cryptographic key having the "loaded and not in use" state is, for instance, a candidate for an exchange with a further cryptographic key that is intended to be used currently or in the future and is therefore, for example, intended to be loaded into the volatile memory.

In further exemplifying embodiments of the present invention, provision is made that a specific cryptographic key has, at a point in time under consideration, exactly one state (and not, for example, several states).

In further exemplifying embodiments of the present invention, provision is made that a state machine is used to associate the state with at least one of the cryptographic keys.

In further exemplifying embodiments of the present invention, provision is made that the method further encompasses: receiving a request with regard to a cryptographic key, the request being characterized, for example, in that the cryptographic key is to be loaded into a or the volatile memory; loading the cryptographic key into the volatile memory.

In further exemplifying embodiments of the present invention, the request described above can be made, for instance, by a job manager. In further exemplifying embodiments, the job manager is a software component (computer program) that is executable, for example, by a computing core of a or the computing device ("host core") and/or that is embodied to manage or implement an execution of cryptographic methods or of steps of cryptographic methods. In further exemplifying embodiments, the job manager is embodied, for instance, to receive requests from an application program and/or to output to the application program a status characterizing an execution of a method or method step.

In further exemplifying embodiments of the present invention, the job manager can, at least temporarily, execute, for example, one or several steps of the method in accordance with the embodiments.

In further exemplifying embodiments of the present invention, it is also possible, for example, to provide a "key loader" that, for instance, is also embodied as a software component (computer program) that, for example, is executable by a computing core of the computing device and/or by a computing core of the HSM (for example, in some embodiments the key loader can also constitute part of the HSM), and/or that is embodied to execute, at least temporarily, for example, one or several steps of the method in accordance with the embodiments, for example loading and/or unloading or managing at least one cryptographic key, and/or managing states of at least one cryptographic key.

In further exemplifying embodiments of the present invention, the key loader can constitute part of a or the cryptography driver, for example similarly to the job manager. In further exemplifying embodiments, the key loader can constitute, as already mentioned above, part of the HSM.

In further exemplifying embodiments of the present invention, the job manager is embodied, for example, to execute synchronous and/or asynchronous "jobs," e.g., cryptographic methods or steps of cryptographic methods, or one or several steps of the method in accordance with the embodiments.

In further preferred embodiments of the present invention, the job manager is embodied to request, for example, the key loader to load a cryptographic key, for instance if the cryptographic key is not already located in the volatile memory.

In further exemplifying embodiments of the present invention, the key loader is embodied to load the key requested by the job manager or to cause the key to be loaded, for instance from the HSM.

In further exemplifying embodiments of the present invention, the key loader is embodied, for instance, to inform the job manager that the requested key has been successfully loaded, or that the requested key, for instance, is already contained (i.e., loaded) in the volatile memory.

In further exemplifying embodiments of the present invention, the job manager can request a reference ("handle") to the key in the context of the key loader, which reference, for instance, characterizes the copy of the corresponding key in the volatile memory or a memory location of the copy of the corresponding key in the volatile memory.

In further exemplifying embodiments of the present invention, the key loader is embodied in such a way that it asynchronously executes or initiates the loading of one or several cryptographic keys, in which context a status of the respective loading operation can be queried, for instance, from various calling contexts.

In further exemplifying embodiments of the present invention, the method further encompasses: ascertaining a first information item that characterizes whether a specific cryptographic key is a key to be stored in exclusively volatile fashion; and, optionally, executing a use of the specific cryptographic key based on the first information item, in particular refraining from nonvolatile storage of the specific cryptographic key. In further exemplifying embodiments, security can thereby be enhanced.

In further exemplifying embodiments of the present invention, the method further encompasses: ascertaining a first variable that characterizes an unoccupied memory area in the volatile memory; and, optionally, clearing or releasing memory in the volatile memory, for example in such a way that at least one further cryptographic key can be loaded into the volatile memory; the clearing being executed, for example, based on at least one predefinable algorithm; and, for example, the at least one algorithm being selectable, for example, during and/or before execution of the method.

In further exemplifying embodiments of the present invention, the clearing or release encompasses: ascertaining at least one cryptographic key that is stored in the volatile memory and is not currently being used; and releasing a memory area, occupied by the cryptographic key currently not being used, of the volatile memory, for example for overwriting with at least one further cryptographic key. In further preferred embodiments, only those cryptographic keys which, for example, are (also) stored in nonvolatile fashion are overwritten.

In further exemplifying embodiments of the present invention, the method further encompasses: leaving the at least one cryptographic key in a or the volatile memory, for example for at least one predefinable time period. In further preferred embodiments, the cryptographic key can thereby be accessed particularly quickly, for instance if it is to be used again after a first utilization. In further preferred embodiments, it is thereby possible in particular to avoid comparatively slow loading operations that involve, for instance, copying the cryptographic key from a nonvolatile memory into the volatile memory.

Further exemplifying embodiments of the present invention refer to an apparatus for executing the method in accordance with the embodiments. The apparatus can be embodied, for example, as a computing device and/or as a hardware security module (HSM).

Further exemplifying embodiments of the present invention refer to a computer-readable storage medium encompassing instructions that, upon execution by a computer, cause the latter to execute the method in accordance with the embodiments.

Further exemplifying embodiments of the present invention refer to a computer program encompassing instructions that, upon execution by a computer, cause the latter to execute the method in accordance with the embodiments.

Further exemplifying embodiments of the present invention refer to a data carrier signal that transfers and/or characterizes the computer program in accordance with the embodiments.

Further exemplifying embodiments of the present invention refer to a use of the method in accordance with the embodiments and/or of the apparatus in accordance with the embodiments and/or of the computer-readable storage medium in accordance with the embodiments and/or of the computer program in accordance with the embodiments and/or of the data carrier signal in accordance with the embodiments for at least one of the following elements: a) managing one or several cryptographic keys, for example for a control device, in particular for a motor vehicle; b) utilizing one or several cryptographic keys, for example for a control device, in particular for a motor vehicle, for example based on a state of at least one cryptographic key and/or based on a state of at least one volatile memory; c) leaving at least one cryptographic key in a or the volatile memory; d) using, for example reusing, at least one cryptographic key that is stored in a or the volatile memory.

Further features, potential applications, and advantages of the present invention are evident from the description below of further exemplifying embodiments that are depicted in the Figures. All features described or depicted in that context, individually or in any combination, constitute the subject matter of exemplifying embodiments, regardless of their respective presentation or depiction in the description or in the figures.

BRIEF DESCRIPTION OF THE DRAWINGS

FIG. 1A schematically shows a simplified flow chart in accordance with exemplifying embodiments of the present invention.

FIG. 1B schematically shows a simplified flow chart in accordance with further exemplifying embodiments of the present invention.

FIG. 1C schematically shows a simplified flow chart in accordance with further exemplifying embodiments of the present invention.

FIG. 1D schematically shows a simplified flow chart in accordance with further exemplifying embodiments of the present invention.

FIG. 1E schematically shows a simplified flow chart in accordance with further exemplifying embodiments of the present invention.

FIG. 2 schematically shows a simplified block diagram in accordance with further exemplifying embodiments of the present invention.

FIG. 3 schematically shows a simplified block diagram in accordance with further exemplifying embodiments of the present invention.

FIG. 9 schematically shows aspects in accordance with further exemplifying embodiments of the present invention.

DETAILED DESCRIPTION OF EXAMPLE EMBODIMENTS

Figure 8:
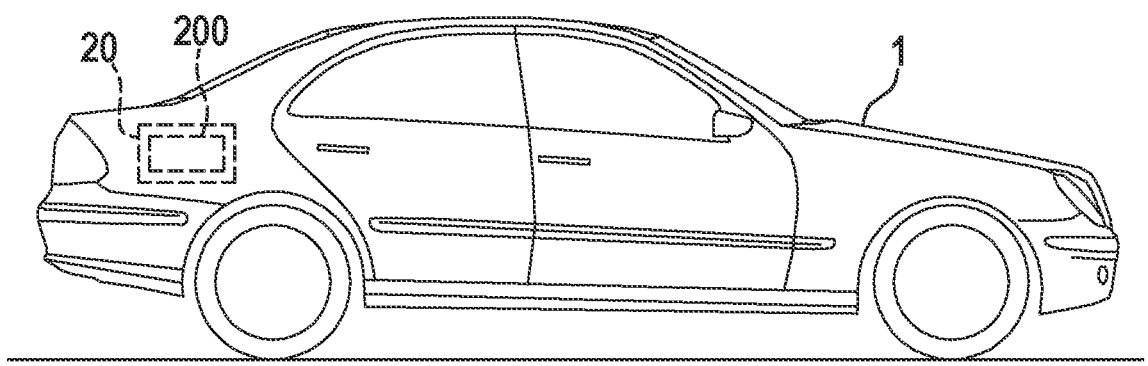
FIG. 8 schematically shows a control device in a destination system in accordance with further exemplifying embodiments of the present invention.

FIG. 1A schematically shows a simplified flow chart of a method for managing cryptographic keys in accordance with exemplifying embodiments. The method can be used, for example, for a control device 20 (see FIG. 8), in particular for a motor vehicle 1, but in further exemplifying embodiments is not limited thereto. The method has the following steps (see FIG. 1A): associating 100 a state $Z\_1$ with at least one of the cryptographic keys; using 102 the at least one cryptographic key based on state $Z\_1$. In further exemplifying embodiments, flexible use or utilization of the at least one cryptographic key is thereby made possible.

FIG. 2 shows, by way of example, several cryptographic keys 10, one of which is labeled with the reference character 10_1. Cryptographic keys 10 can be managed, for example, by way of the method in accordance with FIG. 1A.

In further exemplifying embodiments, provision is made that the at least one cryptographic key 10_1 is storable and/or stored at least temporarily in a volatile memory 6a, for example in a working memory or a register memory.

In further exemplifying embodiments, provision is made that the at least one cryptographic key 10_1 is storable and/or stored at least temporarily in a nonvolatile memory 6b, for example in a flash (EEPROM) memory.

In further exemplifying embodiments, the at least one cryptographic key 10_1 can also, for instance, be copied or shifted from nonvolatile memory 6b into volatile memory 6a, which can also be referred to, for example, as "loading."

In further exemplifying embodiments, a deletion or release for overwriting a cryptographic key 10_1 stored in volatile memory 6a can also be referred to, for example, as "unloading."

In further exemplifying embodiments, an optional state machine ZA can be provided in order to influence, in particular to control, the state of one or several keys 10.

Further exemplifying embodiments (see FIG. 3) refer to an apparatus 200 for executing the method in accordance with the embodiments. Apparatus 200 has a computing device ("computer") 202 having at least one computing core 202a, and has a storage device 204, associated with computing device 202, for at least temporary storage of at least one of the following elements: a) data DAT; b) computer program PRG, in particular for executing a method in accordance with the embodiments.

In further preferred embodiments, storage device 204 has a volatile memory 204a (e.g., working memory (RAM)) and/or a nonvolatile memory 204b (e.g., flash EEPROM).

In further preferred embodiments, computing device 202 has at least one of the following elements or is embodied as at least one of said elements: microprocessor (μP); microcontroller (μC); application-specific integrated circuit (ASIC); system on chip (SoC); programmable logic module (e.g., field programmable gate array (FPGA)); hardware circuit; or any combinations thereof.

Further preferred embodiments refer to a computer-readable storage medium SM encompassing instructions PRG that, upon execution by a computer 202, cause the latter to execute the method in accordance with the embodiments.

Further preferred embodiments refer to a computer program PRG encompassing instructions that, upon execution of the program by a computer 202, cause the latter to execute the method in accordance with the embodiments.

Further preferred embodiments refer to a data carrier signal DCS that characterizes and/or transfers the computer program PRG in accordance with the embodiments. Data carrier signal DCS is, for example, receivable via an optional data interface 208 of apparatus 200.

In further exemplifying embodiments, apparatus 200 itself can be embodied as a hardware security module (HSM), a computing core 202b being, for instance, embodied as an HSM core.

In further exemplifying embodiments, apparatus 200 can also, for instance, have an optional hardware security module 206 that, for instance, can have a computing core 206c as well as, for instance, a volatile memory 206a, for instance similar to volatile memory 6a in accordance with FIG. 2, and, for instance, a nonvolatile memory 206b, for instance similar to nonvolatile memory 6b in accordance with FIG. 2.

In other words, in further preferred embodiments volatile memory 6a (FIG. 2) and/or nonvolatile memory 6b can, for instance, be associated with at least one hardware security module 206 (FIG. 3) and/or can be integrated into hardware security module 206.

In further exemplifying embodiments, an optional computing core 202b ("HSM core") of computing device 200 can execute or have the function of HSM 206 or of computing core 206c of HSM 206. In this case, in further preferred embodiments, for instance, the optional separate HSM 206 or its core 206c can be omitted.

In further exemplifying embodiments, apparatus 200 and/or HSM 206 can, for example, be associated with control device 20 (FIG. 8) or, in the case of HSM 206, with a computing device 202 of control device 20 and, for instance, can perform cryptographic functions or methods and, for instance, can manage the aforesaid cryptographic keys 10 (FIG. 3).

In further exemplifying embodiments, computing device 202 (FIG. 3) of apparatus 200 can also have one or several computing cores 202a for executing application programs ("host cores"), which use, for instance, cryptographic functions. In further preferred embodiments, computing device 202 can have at least one computing core 202b that is, for instance, physically separate from host cores 202a ("HSM core"), which is embodied, for instance, for the execution of cryptographic functions (for instance, creating message authentication codes (MACs), ascertaining and/or checking signatures and/or hash values), for example for the host core or cores 202a. In further preferred embodiments, HSM core 202b can, for instance, also execute management of cryptographic keys in accordance with the embodiments.

In further exemplifying embodiments, host cores 202a and HSM core 202b can, for instance, communicate directly with one another, for instance by message exchange ("message passing") and/or by way of shared memory areas, for instance of RAM 204a.

In further preferred embodiments it is possible to ensure, for instance by way of hardware-based security mechanisms, that host cores 202a, for instance, cannot access cryptographic keys 10 (FIG. 2) that are managed by HSM core 202b, or corresponding memory areas in which those cryptographic keys 10 are stored.

In further exemplifying embodiments, at least one of the programs below can be executed by apparatus 200:
1. Host application PRG (see also, for instance, block B5 of FIG. 4), i.e., for instance, an application that, for instance, is executable by host core or cores 202a and that uses the cryptographic functions that can be furnished by HSM 206 or by HSM core 202b;
2. HSM driver (see also, for instance, block B2 of FIG. 4), a software component or computer program that is executable by host core or cores 202a and constitutes an interface for the cryptographic functions of HSM 206 or of HSM core 202b. In further preferred embodiments, for example, the host application can communicate or interact, in particular exclusively, via the HSM driver with HSM 206 or with HSM core 202b;
3. HSM software; this is, for instance, a computer program that is executable on HSM core 206c, 202b (i.e., for instance, in an environment secured with respect to host cores 202a) and that, for instance, executes the cryptographic functions and/or management, for instance, of cryptographic keys 10.

In further exemplifying embodiments, provision is made that state Z_1 (FIG. 1) of the at least one cryptographic key 10_1 is characterized by at least one of the following elements: a) unloaded, the at least one cryptographic key 10_1 being, for example, not located in a or the volatile memory 6a, 206a (but instead, for example, in a or the nonvolatile memory 6b, 206b); b) loaded and in use, the at least one cryptographic key 10_1, for example, being located in volatile memory 6a, 206a and currently being used, for example, by a computer program PRG, for example a cryptography driver object; c) loaded and not in use, the at least one cryptographic key 10_1, for example, being located in a or the volatile memory 6a, 206a and not currently being used, for example not (even) by a or the cryptography driver object; d) loading, a loading operation of the at least one cryptographic key 10_1, for example from nonvolatile memory 6b, 206b into volatile memory 6a, 206a, being, for example, not already complete; e) unloading, an unloading operation of the at least one cryptographic key 10_1, for example from volatile memory 6a, 206a, being, for example, not already complete; f) waiting for unoccupied memory space in volatile memory 6a, 206a (e.g., until memory space in volatile memory 6a, 206a has been cleared, for instance by deletion or unloading of another key); g) updating, for example upon request by another unit or higher-level (processing) layer. In further exemplifying embodiments, a cryptographic key having the "updating" state is not used. In further exemplifying embodiments, for example, it is possible instead to wait for a subsequent state in which updating of the cryptographic key is complete.

In further exemplifying embodiments, a cryptographic key having the "loaded and not in use" state is, for instance, a candidate for exchange with a further cryptographic key that is to be used currently or in the future and is therefore, for example, to be loaded into volatile memory 6a, 206a.

In further exemplifying embodiments, provision is made that a specific cryptographic key has, at a point in time under consideration, exactly one state (and not, for example, several states).

In further exemplifying embodiments, provision is made that state machine ZA (FIG. 2) is used to associate state Z_1 (FIG. 1) with at least one of cryptographic keys 10.

In further exemplifying embodiments (see FIG. 1B), provision is made that the method further encompasses: receiving 110 a request A1 with regard to a cryptographic key 10_1, request A1 being characterized, for example, in that cryptographic key 10_1 is to be loaded into a or the volatile memory 6a, 206a; loading 112 cryptographic key 10_1 into volatile memory 6a, 206a.

Figure 4:
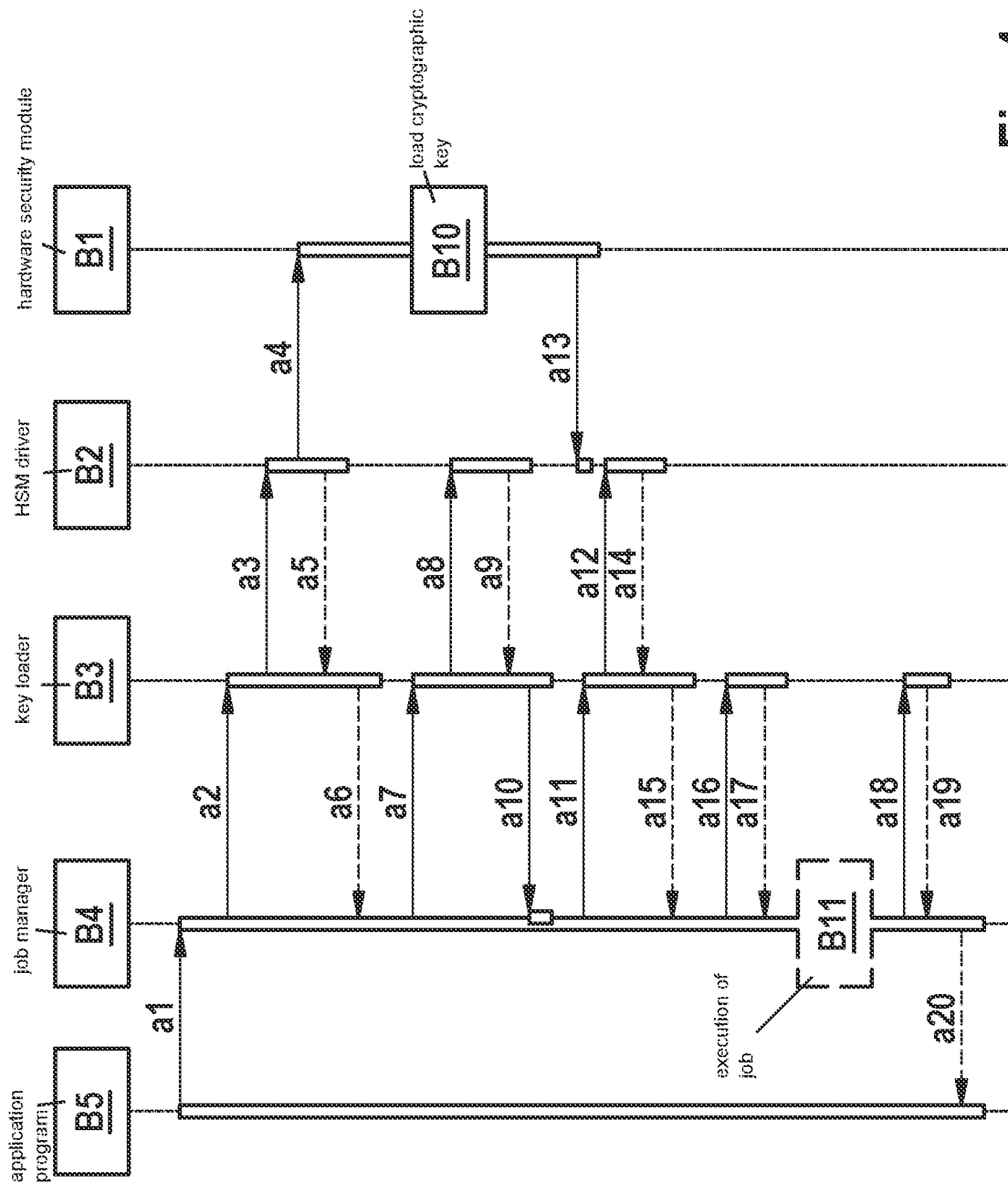
FIG. 4 schematically shows a simplified flow chart in accordance with further exemplifying embodiments of the present invention.

In further exemplifying embodiments, request A1 described above can be made, for instance, by a job manager (see, for instance, block B4 of FIG. 4). In further exemplifying embodiments, the job manager is a computer program that is executable, for example, by HSM 206 (FIG. 3) or by a computing core 206c of HSM 206 (or by a host core 202a) and/or that is embodied to manage an execution of cryptographic methods or of steps of cryptographic methods. In further exemplifying embodiments, the job manager is embodied, for instance, to receive requests from an application program B5 (FIG. 4) and/or to output to application program B5 a status characterizing an execution of a method or method step.

In further exemplifying embodiments, the job manager can, at least temporarily, execute one or several steps of the method in accordance with the embodiments.

In further exemplifying embodiments it is also possible, for example, to provide a key loader B3 (see, for instance, FIG. 4) that, for instance, is also embodied as a computer program that, for example, is executable by a host core 202a, and/or that is embodied to execute, at least temporarily, for example, one or several steps of the method in accordance with the embodiments, for example loading and/or unloading or managing at least one cryptographic key 10_1.

In further exemplifying embodiments, the job manager is embodied, for example, to execute synchronous and/or asynchronous jobs, e.g., cryptographic methods or steps of cryptographic methods, or one or several steps of the method in accordance with the embodiments.

In further preferred embodiments, the job manager is embodied, for example, to instruct the key loader to load a cryptographic key or cause it to be loaded, for instance if the cryptographic key is not already located in the volatile memory.

In further exemplifying embodiments, the key loader is embodied to load the key requested by the job manager or to cause the key to be loaded.

In further exemplifying embodiments, the key loader is embodied, for instance, to inform the job manager that the requested key has been successfully loaded, or that the requested key, for instance, is already contained (i.e., loaded) in the volatile memory.

In further exemplifying embodiments, the job manager can request a reference ("handle") to the key in the context of the key loader, which reference, for instance, characterizes the copy of the corresponding key in the volatile memory.

In further exemplifying embodiments, the key loader is embodied in such a way that it asynchronously executes or initiates the loading of one or several cryptographic keys, in which context a status of the respective loading operation can be queried, for instance, from various invoking contexts.

In further exemplifying embodiments (see FIG. 1C), the method further encompasses: ascertaining 120 a first information item I1 that characterizes whether a specific cryptographic key 10_1 is a key to be stored in exclusively volatile fashion; and, optionally, executing 122 a use of the specific cryptographic key based on first information item I1, in particular, for instance, refraining from nonvolatile storage of the specific cryptographic key. In further exemplifying embodiments, security can thereby be enhanced.

In further exemplifying embodiments (see FIG. 1D), the method further encompasses: ascertaining 130 a first variable G1 that characterizes an unoccupied memory in volatile memory 6a, 206a; and, optionally, clearing 132 or releasing memory in volatile memory 6a, 206a, for example in such a way that at least one further cryptographic key can be loaded into volatile memory 6a, 206a.

In further exemplifying embodiments (see FIG. 1E), the clearing or release encompasses: ascertaining 132a at least one cryptographic key that is stored in volatile memory 6a, 206a and is not currently being used; and releasing 132b a memory area, occupied by the cryptographic key currently not being used, of volatile memory 6a, 206a, for example for overwriting with at least one further cryptographic key.

In further exemplifying embodiments (see FIG. 1A), the method further encompasses: leaving 102a the at least one cryptographic key 10_1 in a or the volatile memory 6a, 206a, for example for at least one predefinable time period. In further preferred embodiments, cryptographic key 10_1 can thereby be accessed particularly quickly, for instance if it is to be used again after a first utilization. In further preferred embodiments, it is thereby possible in particular to avoid comparatively slow loading operations that involve, for instance, copying cryptographic key 10_1 from a nonvolatile memory 6b, 206b into volatile memory 6a, 206a.

FIG. 4 schematically shows a simplified flow chart for, for instance, synchronous processing of jobs in accordance with further exemplifying embodiments. Block B1 symbolizes a hardware security module (see also, for instance, reference character 206 of FIG. 3), block B2 symbolizes an HSM driver, block B3 symbolizes a key loader, block B4 symbolizes a job manager, and block B5 symbolizes an application program.

Arrow a1 symbolizes a request of application program B5 to job manager B4 to execute a job. Job manager B4 instructs key loader B3 (see arrow a2) to load a cryptographic key (usable, for example, for the job to be executed) and, if applicable, to lock it with respect to overwriting (e.g., in order to recover unoccupied memory space in the volatile memory). Key loader B3 signals to HSM B1 via HSM driver B2, by way of arrows a3, a4, that a loading operation for a cryptographic key 10_1 (FIG. 2) is to be executed.

In further exemplifying embodiments, element a2 (and, for instance, also element a31 in accordance with FIG. 5; see below) does not provide that the cryptographic key is locked in the sense that it is not usable, for instance, at least temporarily in chronologically overlapping fashion by other cryptography driver objects. Element a2 (and, for instance, also element a31 in accordance with FIG. 5; see below) instead provides, for instance, that the cryptographic key is locked in the sense that it is not selectable for release, for instance if the volatile memory for the cryptographic keys is full and a release of memory space therein is therefore desirable.

In further exemplifying embodiments it is therefore possible, for instance, that, for instance, as soon as a key is loaded, a simultaneous or at least partly chronologically overlapping use of that key occurs, for instance, by different cryptography driver objects.

In further exemplifying embodiments one or several, for instance all, cryptography drivers or cryptography driver objects can set a respective lock with respect to a key (the locks are, for instance, not mutually exclusive). In further preferred embodiments this has the effect that a key, for instance once it has been loaded, remains in use as long as the total number of locks has a non-negligible value (greater than zero).

In further exemplifying embodiments, a key can transition into the "loaded and not in use" state (see FIG. 6 below) when the last lock has been removed. In further preferred embodiments, the relevant key can then, for instance, also be overwritten again, for instance in order to release memory.

Block B10 correspondingly symbolizes the loading of cryptographic key 10_1, for instance, from nonvolatile memory 206b into volatile memory 206a (FIG. 3).

In further exemplifying embodiments, HSM driver B2 signals to key loader B3 (see arrow a5) that the cryptographic key is currently being loaded and the cryptographic key thus has the "loading" state. In further preferred embodiments, the situation is comparable for components B3, B4 (see arrow a6).

In further exemplifying embodiments, job manager B4 queries the current state of the cryptographic key (see arrows a7, a8), and components B2, B3 correspondingly report back a current status (e.g., "key (still) loading") (see arrows a9, a10).

In further exemplifying embodiments, arrow a13 symbolizes the fact that HSM B1 signals the "key loaded" state to HSM driver B2. In further preferred embodiments this "key loaded" state can correspondingly be reported, after a new request all by job manager B4 (see also request a12 of key loader B3), to components B3, B4 in the form of signals a14, a15.

In further exemplifying embodiments, job manager B4 asks key loader B3 for a reference ("handle") to the loaded cryptographic key (see arrow a16). In further preferred embodiments, key loader B3 signals the reference to the loaded cryptographic key to job manager B4 (see arrow a17). Block B11 symbolizes, by way of example, execution of the job characterized by arrow a1, for instance using the cryptographic key that has meanwhile been loaded.

In further exemplifying embodiments, the cryptographic key is unloaded or released again (see arrow a18) after execution B11 of the job; for instance, a memory area of the volatile memory which since then has been occupied by the cryptographic key can also be released and is thus usable, if applicable, for another key. Optionally, a lock that may have been applied to the key (see arrow a2) can also be canceled. By way of signal a18, job manager B4 can signal to key loader B3, for example, that the relevant key is not being used at present. If, for example, the relevant key is not being used by any of the, if applicable, several HSM driver objects, the relevant key can assume, for instance, the "loaded and not in use" state.

Arrow a19 symbolizes an optional confirmation of release a18 on the part of key loader B3.

In further exemplifying embodiments, job manager B4 can signal to application program B5 that the job has been executed (see arrow a20).

In further exemplifying embodiments, job manager B4 can check, for instance after receiving inquiry a1, whether a cryptographic key is necessary or indicated for execution of the job. In further preferred embodiments, for example, cryptographic services or functions that do not require a cryptographic key for their execution, for instance the calculation of hash values, can also be provided and/or used. If a cryptographic key is necessary or indicated for execution of the job, job manager B4 requests loading from key loader B3 (see arrow a2).

In further exemplifying embodiments, key loader B3 can manage the state of at least one cryptographic key 10_1 (FIG. 2), for example of several or all cryptographic keys 10. For example, after receiving request a2, key loader B3 can ascertain, in accordance with FIG. 4, that the cryptographic key to be used for execution of the job is not already present in the volatile memory, and can therefore initiate the loading operation (see arrow a3), the loading operation being executed, for instance, asynchronously by HSM B1 (see also, for instance, HSM cores 206c, 202b).

In further exemplifying embodiments, job manager B4 can query the state of the loading operation (see, for instance, arrows a7, a11), for instance until the key is loaded.

Figure 5:
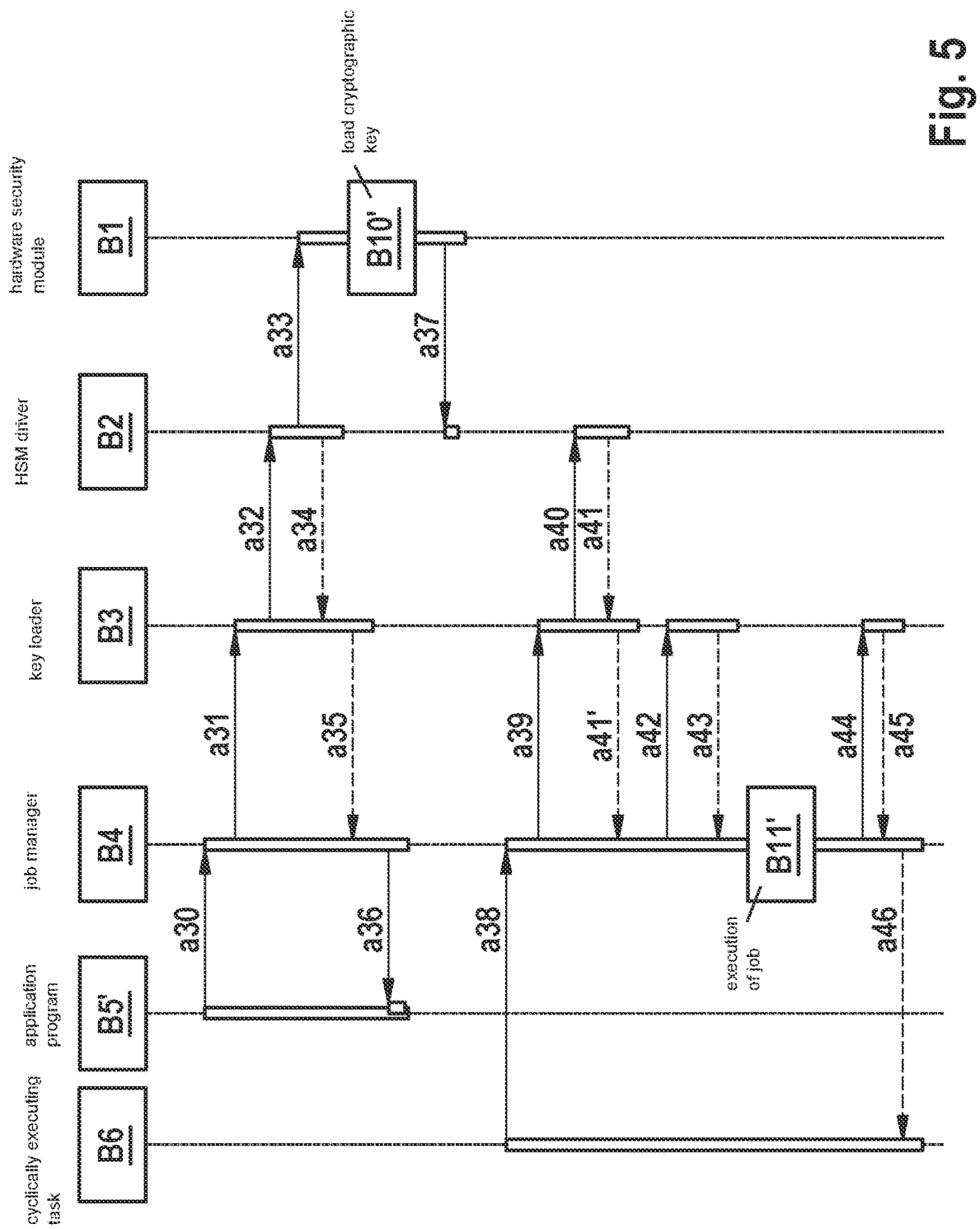
FIG. 5 schematically shows a simplified flow chart in accordance with further exemplifying embodiments of the present invention.

FIG. 5 schematically shows a simplified flow chart for, for instance, asynchronous processing of jobs in accordance with further exemplifying embodiments. Block B1 symbolizes a hardware security module (see also, for instance, reference character 206 of FIG. 3), block B2 symbolizes an HSM driver, block B3 symbolizes a key loader, block B4 symbolizes a job manager, block B5' symbolizes an application program, and block B6 symbolizes a cyclically executed task, i.e., for instance a cyclically executed process.

Arrow a30 symbolizes a request by application program B5' to job manager B4 to execute a job. Job manager B4 instructs key loader B3 (see arrow a31) to load (or cause the loading of) a cryptographic key (for example, one usable for the job to be executed) and, if applicable, to lock it, for example in order to protect it from overwriting. Key loader B3 signals to HSM B1, via HSM driver B2 by way of arrows a32, a33, that a loading operation for a cryptographic key 10_1 (FIG. 2) is to be executed.

Block B10' correspondingly symbolizes the loading of cryptographic key 10_1, for instance, from nonvolatile memory 206b into volatile memory 206a (FIG. 3).

Arrows a34, a35 symbolize signaling to components B3, B4 with regard to the current state of the loading of the cryptographic key, and arrow a36 comparably symbolizes signaling of the status of execution of the job to application program B5'.

In further exemplifying embodiments, HSM B1 signals a return code regarding loading B10' (see arrow a37) to HSM driver B2.

In further exemplifying embodiments, task B6 signals the execution of a planned function to job manager B4 (see arrow a38), which then queries the loading state of the previously requested cryptographic key (see arrows a39, a40). HSM driver B2 signals that the cryptographic key has now been loaded (see arrows a41, a41').

In further exemplifying embodiments, job manager B4 asks key loader B3 for a reference ("handle") to the loaded cryptographic key (see arrow a42). In further preferred embodiments, key loader B3 signals the reference to the loaded cryptographic key to job manager B4 (see arrow a43). Block B11' symbolizes, by way of example, execution of the job characterized by arrow a30, for instance using the cryptographic key that has meanwhile been loaded.

In further exemplifying embodiments, the cryptographic key is unloaded or released again (see arrow a44) after execution B11' of the job; a memory area of the volatile memory which since then has been occupied by the cryptographic key can also, for instance, be released and is thus usable, if applicable, for another key. Arrow a45 symbolizes an optional confirmation of release a44 on the part of key loader B3. Arrow a46 symbolizes, by way of example, completion of the planned function.

In further exemplifying embodiments, in the context of the exemplifying asynchronous execution of the task in accordance with FIG. 5, the latter can be started by way of request a30 while a further execution is being performed, for instance by way of cyclic task B6. In further preferred embodiments, the principle of loading a cryptographic key can correspond to the steps described by way of example with reference to FIG. 4.

In further exemplifying embodiments, computing time on a host core 202a (FIG. 3) that, for instance, is executing application program B5, B5', which time host core 202a would otherwise need to use, for instance, for a blocking polling loop, for instance in order itself to wait for completion of the loading of the cryptographic key, can be saved by the procedure described by way of example above.

In further exemplifying embodiments, a throughput of host core 202a, for instance in an automotive open system architecture (AUTOSAR) system, can therefore be increased by way of the procedure described by way of example above.

Utilization of the management of cryptographic keys in accordance with the embodiments makes possible, at least temporarily and/or at least in some embodiments, a reduction in latency in the execution of jobs, for instance by the fact that at least some keys can be left in the comparatively fast volatile memory even when a job that has used the key or keys has been completed, for example in contradistinction to constant deletion of the keys from the volatile memory directly after use, and constant reloading of the keys. This means, for instance, that a subsequent job that is intended to use the key or keys finds the key or keys, for instance, already in the volatile memory (provided it has not, for instance, already been overwritten in accordance with further exemplifying embodiments), so that the key or keys does/do not first need to be loaded into the volatile memory.

In further exemplifying embodiments, various methods for exchanging or overwriting keys can be provided, which are embodied to retain or leave in the volatile memory those keys that will be (re)used in the future with the highest probability and/or, for instance, the keys having a highest priority; this offers a performance advantage and increases the throughput (characterizable, for instance, by a number of jobs executed in a predefinable time) of a system.

In further exemplifying embodiments, several jobs can be executed simultaneously or at least in part in chronologically overlapping fashion, for example by HSM driver B2 (FIGS. 4, 5).

While the exemplifying embodiments in accordance with FIGS. 4, 5 describe possible scenarios in which a cryptographic key is loaded, for instance, from a nonvolatile memory into a volatile memory, in further exemplifying embodiments one or several of the situations recited below, inter alia, can also occur.

In further exemplifying embodiments, a cryptographic key can already be present in the volatile memory, for instance because it has already been loaded earlier. In further preferred embodiments, a cryptographic key can be embodied, for instance, as a "startup" key that is loaded into the volatile memory upon startup of HSM 206.

In further exemplifying embodiments, a cryptographic key can be embodied, for instance, as a key to be stored (for instance, only) in volatile fashion, and can thus, for instance, already be present (for instance, only) in the volatile memory.

In further exemplifying embodiments, the unoccupied memory space in the volatile memory may no longer be sufficient for loading of a (for instance, further) cryptographic key, in which context, if applicable, at least one of the cryptographic keys located in the volatile memory can be unloaded or released. In further preferred embodiments, provision can be made that one or several of the cryptographic keys present in the volatile memory must not be unloaded; this can be, for instance, a key to be stored (for instance, only) in volatile fashion, and/or a "startup" key, and/or a cryptographic key that is currently being used by another HSM driver object.

In further exemplifying embodiments, key loader B3 can furnish or execute one or several of the following aspects:

a) loading a cryptographic key stored in the nonvolatile memory into the volatile memory, for instance when job manager B4 requests it (see, for instance, arrow a2 of FIG. 4);

b) ascertaining which keys are keys to be stored in volatile fashion, in particular in order to prevent them from being unloaded;

c) releasing volatile memory so that a new key can be loaded, in which context, for example, no key currently being used is unloaded;

d) ascertaining which keys are "startup" keys, in particular in order to prevent them from being unloaded;

e) ascertaining which keys are being used, for instance, by each of the possibly several HSM driver objects.

Figure 6:
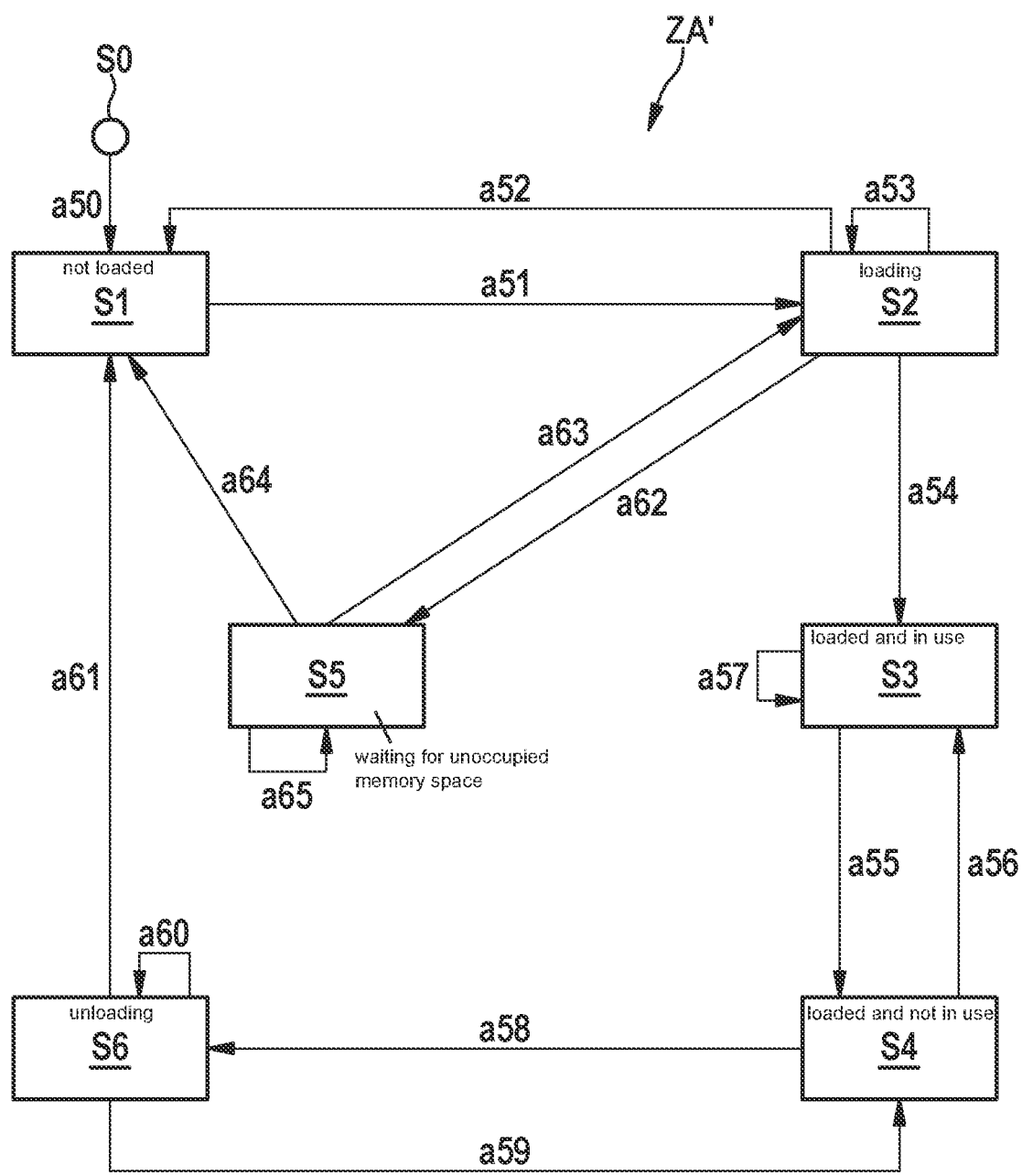
FIG. 6 schematically shows a simplified state diagram in accordance with further exemplifying embodiments of the present invention.

FIG. 6 is a schematic simplified state diagram in accordance with further exemplifying embodiments which illustrates some possible states of a cryptographic key 10_1 (FIG. 2) in accordance with further exemplifying embodiments. The states that are depicted by way of example can correspond, for example, to a subset of states controllable by way of a state machine ZA' (see also state machine ZA for controlling states of cryptographic key 10 in accordance with FIG. 2). For example, state machine ZA in accordance with FIG. 2 can have the configuration ZA' in accordance with FIG. 6.

Block S0 symbolizes an initial state from which a change is made, by way of state transition a50, to the "unloaded" or "not loaded" state S1.

From state S1, "not loaded," in further preferred embodiments a change can be made by way of state transition a51 to state S2, "loading." This can be the case, for instance, when key loader B3 (FIG. 4) requests from HSM driver B2 the loading of a cryptographic key (see arrow a3 of FIG. 4).

In further preferred embodiments, a state transition a52 characterizes a change from state S2 back to state S1, for instance if loading has not been successfully executed. In further preferred embodiments, this state transition a52 can also occur if it is not possible to find a key that can be unloaded.

In further preferred embodiments, a state transition a53 symbolizes the retention of state S2, thus characterizing, for instance, the fact that loading of the cryptographic key is continuing.

In further preferred embodiments, a state transition a54 characterizes a change from state S2 to state S3, "in use" or "loaded and in use."

In further preferred embodiments, state transition a55 characterizes a change from state S3 to state S4, "loaded and not in use."

In further preferred embodiments, a state transition a56 characterizes a change from state S4 to state S3, in which the relevant cryptographic key can be locked, for instance so that it cannot be selected for release, for instance if the volatile memory for the cryptographic keys is full and a release of memory space therein is desirable.

In further preferred embodiments, a state transition a57 symbolizes the retention of state S3, thus characterizing, for instance, the fact that the cryptographic key is still "loaded and in use."

In further preferred embodiments, a state transition a58 characterizes a change from state S4 to state S6, "unloading," in which the relevant cryptographic key or the memory area of the, for instance, volatile memory used by it is released.

In further preferred embodiments, a state transition a59 characterizes a change from state S6 back to state S4, for example if release of the key or of the associated memory area cannot be executed successfully.

In further preferred embodiments, a state transition a60 symbolizes the retention of state S6, thus characterizing, for instance, the fact that unloading or release is continuing.

In further preferred embodiments, a state transition a61 characterizes a change from state S6 to state S1, for instance when release of the key or of the associated memory area has been completed.

In further preferred embodiments, a state transition a62 characterizes a change from state S2 to state S5, "waiting for unoccupied memory space, for instance, in the volatile memory," for instance if a unoccupied memory area for the key to be loaded first needs to be created for loading from state S2.

A state transition a65 from state S5 to state S5 itself symbolizes the retention of state S5 in accordance with further exemplifying embodiments, for instance when the release of a memory area for acceptance of a new key to be loaded is continuing.

In further exemplifying embodiments, a state transition a63 characterizes a change from state S5 to state S2, for instance when unoccupied memory space for the key to be loaded has been created for loading in accordance with state S2.

In further preferred embodiments, further states in addition to those illustrated here by way of example in FIG. 6 can be provided and, for instance, can be associated at least temporarily with at least one of cryptographic keys 10 (FIG. 2).

In further exemplifying embodiments, provision is made that state machine ZA (FIG. 2) is used in order to associate the respective state S1, S2, etc. with at least one of cryptographic keys 10. By way of example, the state labeled by way of example with the reference character Z_1 in FIG. 1A can correspond at least temporarily to at least one of states S1, S2, etc. illustrated here by way of example in FIG. 6.

In further preferred embodiments, it may happen that several jobs that are being executed at least in part in chronologically overlapping fashion use the same cryptographic key. In further preferred embodiments, no conflicts arise in this context because key loader B3 (FIG. 4) assigns a respectively corresponding state, e.g., "loading," to the key that is to be loaded.

In further preferred embodiments, it is possible to provide a selection method that can be used to ascertain which of, if applicable, several unused loaded cryptographic keys is to be unloaded or to be unloaded first, for instance when unoccupied memory is required in volatile memory 6a, 206a for loading new keys.

In further preferred embodiments, the selection method can be embodied configurably, for instance configurably in a pre-compile phase.

In further preferred embodiments, the selection method can be based on information that is available, for instance, at a runtime of apparatus 200, 206, for instance:
a) unloading the key that, of all the loaded keys, has not been used for the longest time;
b) unloading the key that has been used least often;
c) unloading a key selected on a random or pseudo-random basis.

In further preferred embodiments, the selection method can be based on an individual priority of the cryptographic keys, which is assigned, for instance, statically to the keys. In further preferred embodiments, for instance, the key that is currently unused, having the lowest priority, can correspondingly be unloaded.

Figure 7:
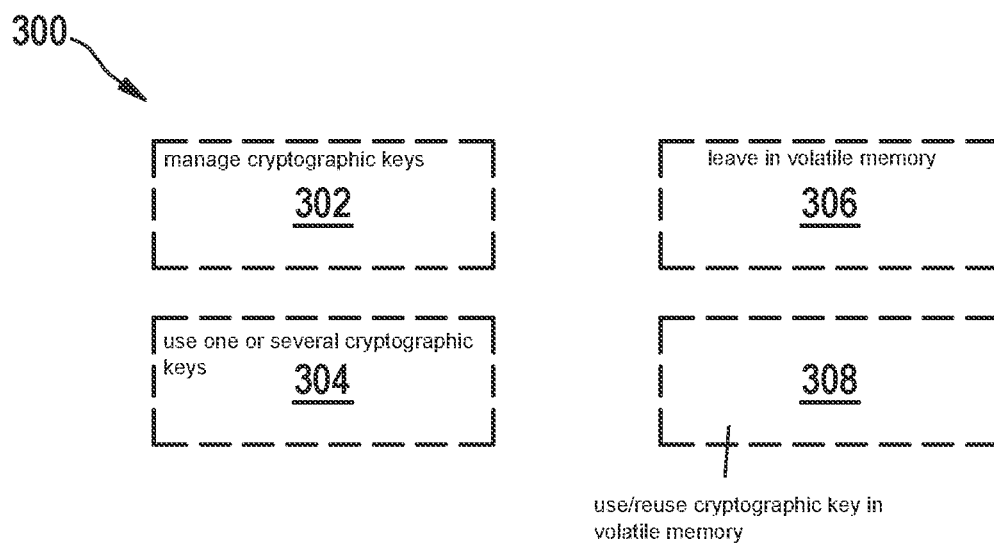
FIG. 7 schematically shows aspects of uses in accordance with further exemplifying embodiments of the present invention.

Further exemplifying embodiments (see FIG. 7) refer to a use 300 of the method in accordance with the embodiments and/or of the apparatus in accordance with the embodiments and/or of the computer-readable memory medium in accordance with the embodiments and/or of the computer program in accordance with the embodiments and/or of the data carrier signal in accordance with the embodiments for at least one of the following elements: a) managing 302 one or several cryptographic keys 10, 10_1, for example for a control device 20, in particular for a motor vehicle 1; b) using 304 one or several cryptographic keys, for example for a control device, in particular for a motor vehicle, for example based on a state Z_1 of at least one cryptographic key and/or based on a state of at least one volatile memory 6a, 206a; c) leaving 306 at least one cryptographic key in a or the volatile memory; d) using 308, for example reusing, at least one cryptographic key that is stored in a or the volatile memory.

FIG. 9 schematically shows aspects in accordance with further exemplifying embodiments which refer, for instance, to an unloading of keys from the volatile memory or a replacement or overwriting.

If the memory for the keys, for instance volatile memory 6a, 206a, is full, for instance does not have sufficient unoccupied memory space for loading or storing a new key, then in accordance with further exemplifying embodiments one or several keys present in memory 6a, 206a are unloaded. In further preferred embodiments, the key loader ascertains or indicates which key or keys is/are to be unloaded, for instance based on a selected algorithm.

In further preferred embodiments, the key loader can, for instance, unload successive keys, for instance, until sufficient unoccupied memory is (again) present in volatile memory 6a, 206a, for instance in order to load at least one new key or to store it at least temporarily in volatile memory 6a, 206a.

FIG. 9 shows, by way of example, a diagram for the unloading of keys in accordance with further exemplifying embodiments; in step 1 a job 0 requires "Key 0," and "Key 0," is therefore loaded, for instance, from a nonvolatile memory into volatile memory 6a, 206a. In FIG. 9, occupancy of the volatile memory is symbolized by the "table" having five rows and one column.

In step 2, a job 1 requires "Key 1," and "Key 1" is therefore also loaded. In step 3, a job 2 requires "Key 2," and "Key 2" is therefore also loaded. "Key 2" is, for instance, twice the size of the "Key 0" and "Key 1" keys.

It is assumed by way of example that proceeding from the state shown in step 3 of FIG. 9, a further job is intended to use a further key ("Key 3") for which sufficient unoccupied memory in the volatile memory is not available. For example, the further "Key 3" has the same size as "Key 2." In further embodiments, loading of the further "Key 3" can therefore fail, and in accordance with further exemplifying embodiments the key loader can unload one or several of the loaded keys ("Key 0," "Key 1").

In further preferred embodiments, in which the selected algorithm provides, for unloading, that the key to be unloaded is the one that (with reference to the further loaded keys) has not been used for the longest time ("least recently used"), the key loader will thus, for instance, unload "Key 0" or release its memory space in the volatile memory (see step 4 of FIG. 9), and if applicable will attempt again to load the further key ("Key 3"). In step 4, however, sufficient unoccupied continuous memory is still not available for this. In step 5, the key loader therefore also unloads "Key 1." In step 6, the key loader once again loads the further key ("Key 3"), this time successfully, since sufficient continuous unoccupied memory is now available. In further preferred embodiments, the further job that is using the further key ("Key 3") can then be executed.

What is claimed is:

1. A method for managing cryptographic keys, comprising the following steps:
associating a respective state with each cryptographic key of at least one of the cryptographic keys;
using the at least one cryptographic key based on the state;
wherein, in the associating step, a state machine is used to associate the respective state with each cryptographic key of the at least one of the cryptographic keys, wherein states of the state machine include: a) unloaded, the cryptographic key is not located in a volatile memory; b) loaded and in use, the cryptographic key is located in the volatile memory and currently being used; c) loaded and not in use, the cryptographic key is located in the volatile memory and not currently being used; d) loading, a loading operation of the cryptographic key from a nonvolatile memory into the volatile memory being not already complete; e) unloading, an unloading operation of the cryptographic key from the volatile memory not already complete; f) waiting for unoccupied memory space in the volatile memory;
wherein the respective state of each cryptographic key of the at least one of the cryptographic keys corresponds to one of the states of the state machine; and
wherein the method further comprises:
ascertaining a first information item that characterizes whether a specific cryptographic key is a key to be stored in exclusively volatile fashion;
executing a use of the specific cryptographic key based on the first information item including refraining from nonvolatile storage of the specific cryptographic key.

2. The method as recited in claim 1, wherein the managing of the cryptographic keys is for a control device of a motor vehicle.

3. A method for managing cryptographic keys, the method comprising the following steps:
associating a respective state with each cryptographic key of at least one of the cryptographic keys;
using the at least one cryptographic key based on the state;
wherein, in the associating step, a state machine is used to associate the respective state with each cryptographic key of the at least one of the cryptographic keys, wherein states of the state machine include: a) unloaded, the cryptographic key is not located in a volatile memory; b) loaded and in use, the cryptographic key is located in the volatile memory and currently being used; c) loaded and not in use, the cryptographic key is located in the volatile memory and not currently being used; d) loading, a loading operation of the cryptographic key from a nonvolatile memory into the volatile memory being not already complete; e) unloading, an unloading operation of the cryptographic key from the volatile memory not already complete; f) waiting for unoccupied memory space in the volatile memory;
wherein the respective state of each cryptographic key of the at least one of the cryptographic keys corresponds to one of the states of the state machine; and
wherein the method further comprises:
ascertaining a first variable that characterizes an unoccupied memory area in the volatile memory.

4. The method as recited in claim 3, wherein: a) the at least one cryptographic key is storable and/or stored at least temporarily in a volatile memory; and/or b) the at least one cryptographic key is storable and/or stored at least temporarily in a nonvolatile memory.

5. The method as recited in claim 3, further comprising:
clearing memory in the volatile memory in such a way that at least one further cryptographic key can be loaded into the volatile memory, the clearing being executed based on at least one predefinable algorithm; the at least one algorithm being selectable during and/or before execution of the method.

6. The method as recited in claim 5, wherein the clearing includes:
ascertaining at least one cryptographic key that is stored in the volatile memory and is not currently being used; and
releasing a memory area occupied by the cryptographic key currently not being used of the volatile memory for overwriting with at least one further cryptographic key.

7. The method as recited in claim 3, further comprising:
leaving the at least one cryptographic key in a volatile memory for at least one predefinable time period.

8. An apparatus configured to manage cryptographic keys, the apparatus comprising:
a computing device including a microprocessor and/or a microcontroller and/or an application-specific integrated circuit and/or a system on chip and/or a field programmable gate array and/or a hardware circuit, the computing device configured to:
associate a respective state with each cryptographic key of at least one of the cryptographic keys;
use the at least one cryptographic key based on the state;
wherein, the computing device is configured to associate the respective state with each of the at least one of the cryptographic keys using a state machine, wherein states of the state machine include: a) unloaded, the cryptographic key is not located in a volatile memory; b) loaded and in use, the cryptographic key is located in the volatile memory and currently being used; c) loaded and not in use, the cryptographic key is located in the volatile memory and not currently being used; d) loading, a loading operation of the cryptographic key from a nonvolatile memory into the volatile memory being not already complete; e) unloading, an unloading operation of the cryptographic key from the volatile memory not already complete; f) waiting for unoccupied memory space in the volatile memory;
wherein the respective state of each cryptographic key of the at least one cryptographic keys corresponds to one of the states of the state; and
wherein the computing device is further configured to:
receive a request with regard to a cryptographic key, the request being to load the cryptographic key into the volatile memory; and
load the cryptographic key into the volatile memory;
ascertain which of a plurality of cryptographic keys stored in the volatile memory has not been used for a longest time relative to the others of the plurality of cryptographic keys; and
release a memory area occupied by the ascertained cryptographic key, the cryptographic key requested to be loaded being loaded into the released memory area.

9. A non-transitory computer-readable storage medium on which are stored instructions for managing cryptographic keys, the instructions, when executed by a computer, causing the computer to perform the following steps:
- associating a state with at least one of the cryptographic keys;
- using the at least one cryptographic key based on the state;
- wherein, in the associating step, a state machine is used to associate the respective state with each cryptographic key of the at least one of the cryptographic keys, wherein states of the state machine include: a) unloaded, the cryptographic key is not located in a volatile memory; b) loaded and in use, the cryptographic key is located in the volatile memory and currently being used; c) loaded and not in use, the cryptographic key is located in the volatile memory and not currently being used; d) loading, a loading operation of the cryptographic key from a nonvolatile memory into the volatile memory being not already complete; e) unloading, an unloading operation of the cryptographic key from the volatile memory not already complete; f) waiting for unoccupied memory space in the volatile memory; and
- wherein the respective state of each cryptographic key of the at least one of the cryptographic keys corresponds to one of the states of the state machine;
- wherein the instructions, when executed by the computer, further causing the computer to perform:
  - receiving a request with regard to a cryptographic key, the request being to load the cryptographic key into the volatile memory; and
  - loading the cryptographic key into the volatile memory;
  - ascertaining which of a plurality of cryptographic keys stored in the volatile memory has been used least often relative to the others of the plurality of cryptographic keys; and
  - releasing a memory area occupied by the ascertained cryptographic key. the cryptographic key requested to be loaded being loaded into the released memory area.

10. A method for managing cryptographic keys, the method comprising the following steps:
- associating a respective state with each cryptographic key of at least one of the cryptographic keys;
- using the at least one cryptographic key based on the state;
- wherein, in the associating step, a state machine is used to associate the respective state with each cryptographic key of the at least one of the cryptographic keys, wherein states of the state machine include: a) unloaded, the cryptographic key is not located in a volatile memory; b) loaded and in use, the cryptographic key is located in the volatile memory and currently being used; c) loaded and not in use, the cryptographic key is located in the volatile memory and not currently being used; d) loading, a loading operation of the cryptographic key from a nonvolatile memory into the volatile memory being not already complete; e) unloading, an unloading operation of the cryptographic key from the volatile memory not already complete; f) waiting for unoccupied memory space in the volatile memory;
- wherein the respective state of each cryptographic key of the at least one of the cryptographic keys corresponds to one of the states of the state machine; and
- wherein the method is used for at least one of the following:
  - a) managing one or several cryptographic keys for a control device for a motor vehicle;
  - b) utilizing one or several cryptographic keys for a control device for a motor vehicle based on a state of at least one of the cryptographic keys and/or based on a state of at least one volatile memory;
  - c) leaving at least one cryptographic key in the volatile memory;
  - d) using or reusing at least one cryptographic key that is stored in the volatile memory.

11. A method for managing cryptographic keys, comprising the following steps:
- associating a respective state with each cryptographic key of at least one of the cryptographic keys;
- using the at least one cryptographic key based on the state;
- wherein, in the associating step, a state machine is used to associate the respective state with each cryptographic key of the at least one of the cryptographic keys, wherein states of the state machine include: a) unloaded, the cryptographic key is not located in a volatile memory; b) loaded and in use, the cryptographic key is located in the volatile memory and currently being used; c) loaded and not in use, the cryptographic key is located in the volatile memory and not currently being used; d) loading, a loading operation of the cryptographic key from a nonvolatile memory into the volatile memory being not already complete; e) unloading, an unloading operation of the cryptographic key from the volatile memory not already complete; f) waiting for unoccupied memory space in the volatile memory;
- wherein the respective state of each cryptographic key of the at least one of the cryptographic keys corresponds to one of the states of the state machine; and
- wherein the method further comprises:
  - receiving a request with regard to a cryptographic key, the request being to load the cryptographic key into the volatile memory; and
  - loading the cryptographic key into the volatile memory;
  - ascertaining which of a plurality of cryptographic keys stored in the volatile memory has not been used for a longest time relative to the others of the plurality of cryptographic keys; and
  - releasing a memory area occupied by the ascertained cryptographic key, the cryptographic key requested to be loaded being loaded into the released memory area.

12. A method for managing cryptographic keys, comprising the following steps:
- associating a respective state with each cryptographic key of at least one of the cryptographic keys;
- using the at least one cryptographic key based on the state;
- wherein, in the associating step, a state machine is used to associate the respective state with each cryptographic key of the at least one of the cryptographic keys, wherein states of the state machine include: a) unloaded, the cryptographic key is not located in a volatile memory; b) loaded and in use, the cryptographic key is located in the volatile memory and currently being used; c) loaded and not in use, the cryptographic key is located in the volatile memory and not currently being used; d) loading, a loading operation of the cryptographic key from a nonvolatile memory into the volatile memory being not already complete; e) unloading, an unloading operation of the cryptographic key from the volatile memory not already complete; f) waiting for unoccupied memory space in the volatile memory;

wherein the respective state of each cryptographic key of the at least one of the cryptographic keys corresponds to one of the states of the state machine; and wherein the method further comprises:
- receiving a request with regard to a cryptographic key, the request being to load the cryptographic key into the volatile memory; and
- loading the cryptographic key into the volatile memory;
- ascertaining which of a plurality of cryptographic keys stored in the volatile memory has been used least often relative to the others of the plurality of cryptographic keys; and
- releasing a memory area occupied by the ascertained cryptographic key, the cryptographic key requested to be loaded being loaded into the released memory area.

* * * * *